Dec. 4, 1945. H. H. PACKWOOD 2,390,321
GRASS CATCHING APPARATUS
Filed Dec. 6, 1943
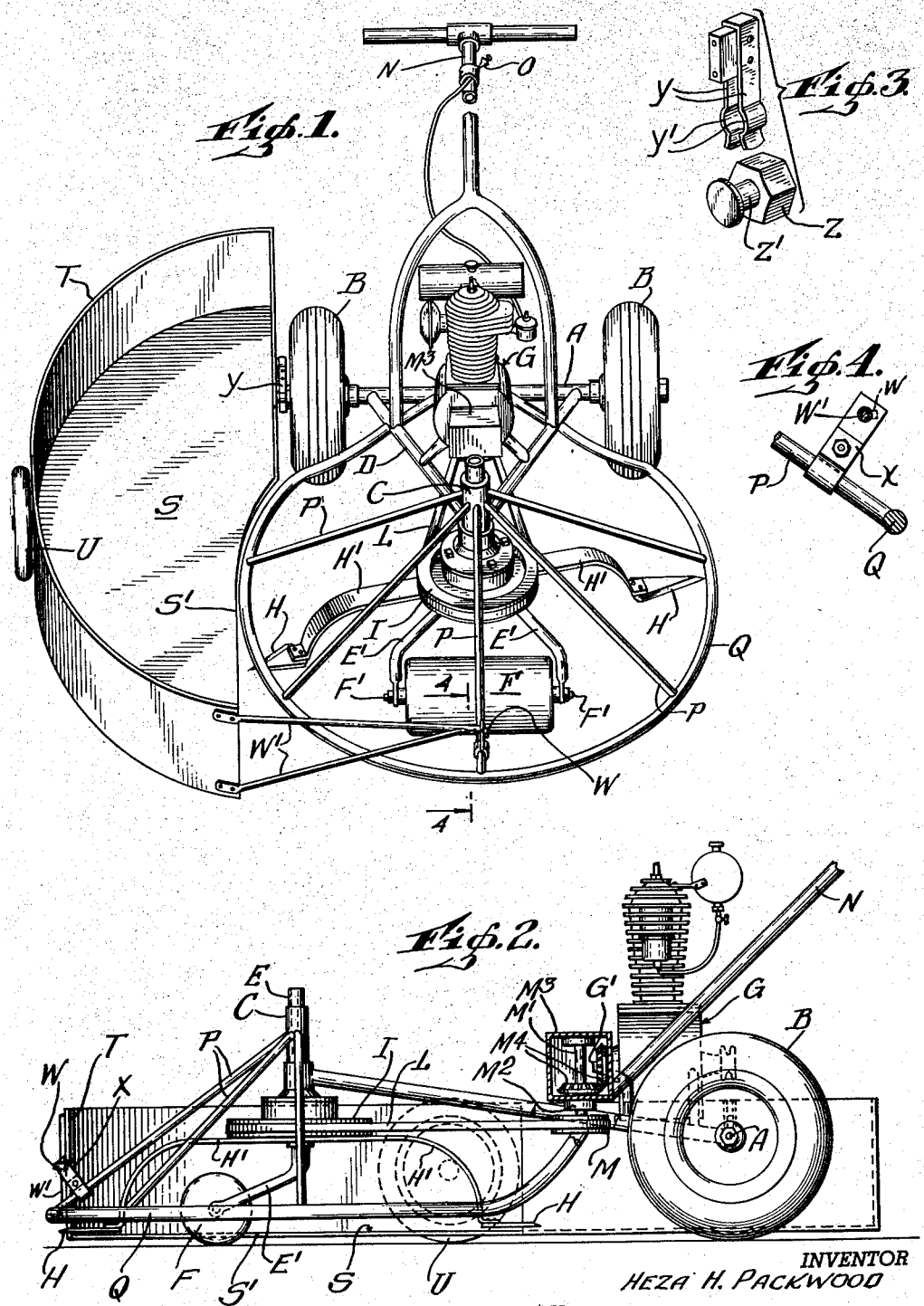
INVENTOR
HEZA H. PACKWOOD
BY John E. Hubbell
ATTORNEY Patented Dec. 4, 1945

2,390,321

UNITED STATES PATENT OFFICE 2,390,321

GRASS CATCHING APPARATUS

Heza H. Packwood, Reserve, La.

Application December 6, 1943, Serial No. 513,005

3 Claims. (Cl. 56—202)

The general object of the present invention is to provide a lawn mower of the type comprising a cutter which revolves about a vertical axis and includes active cutting blade portions sweeping over the ground along an annular path extending circularly about said axis with improved grass catching apparatus.

A primary object of the invention is to provide a lawn mower of the above mentioned type with a grass catcher or collecting device formed and disposed to receive the grass blade tips cut free from the grass roots and thrown to one side of the cutter path of movement over the ground as a result of the centrifugal force and fan actions of the cutter. Advantageously, my novel grass collector includes provisions for its detachable connection to the cutter guard frame or structure with which a lawn mower of the above mentioned type is customarily provided to facilitate the periodic removal of the grass accumulated in the collector.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawing:

Fig. 1 is a perspective view of a lawn mower;

Fig. 2 is a side elevation of a portion of the lawn mower shown in Fig. 1, partly in section on the vertical longitudinal center plane of the lawn mower;

Fig. 3 is a perspective illustrating one of the grass collector attaching devices; and Fig. 4 is an elevation in section on the line 4—4 of Fig. 1 illustrating a second attaching device for the grass collector.

In the accompanying drawing, I have illustrated, by way of example, the use of the present invention in and in connection with a lawn mower of the general type and form disclosed in my prior Patent 2,287,126, granted May 21, 1942. Said lawn mower comprises a horizontally disposed axle A with wheels B journalled thereon and shown as having rubber tires, and also comprises a tubular vertically disposed part C which is laterally displaced from the axle A. The part C and axle A are connected to and form parts of a rigid framework D. The part C forms a support or tubular shaft on which the cutter of the mower is mounted to rotate about a vertical axis. The part C also telescopically receives a post E through which a ground roller F is connected to the lawn mower frame and assists in supporting the latter. The cutter is rotated by an internal combustion motor G mounted on the framework D adjacent the axle A, so that the center of gravity of the lawn mower may be between the part C and the axle A, but should be close to the latter to permit the lawn mower frame to be readily tilted about the axle A to raise the ground roller F, notwithstanding the gravitational force tending to hold the ground roller in contact with the ground. As shown the ground roller F has trunnion pivots F' journalled in a yoke E' rigidly connected to the post E and shaped so that the axis of the ground roller F is laterally displaced from the axis of the part C in a direction opposite to the displacement of the axle A from said axis.

As shown the rotary cutter structure of the lawn mower comprises a pair of horizontally disposed cutting blades H secured to the ends of a metal bar H' forming a cutter carrier which comprises a central, generally horizontal section above the ground roller F, and depending outer portions. The latter are displaced from the cutter axis so that they may rotate about the ground roller with the cutting blades H as close to the ground surface as may be desired. The central portion of the cutter carrier H' is suitably attached to the under side of a driving wheel I surrounding and suitably journalled on the lower end portion of the tubular shaft part C. In the preferred construction shown, the wheel I is a pulley wheel connected by a belt L to a driving pulley M carried at the lower end of a vertical countershaft M' journalled, preferably by means of ball bearings $M^2$ in a gear box $M^3$ and enclosing bevelled gears $M^4$ one mounted on the shaft M' and the other carried by the end of the horizontally disposed crank shaft G' of the internal combustion engine G.

The lawn mower is adapted to be moved manually over the ground through a handle member N which may be of the usual lawn mower form and connected to the lawn mower framework in the usual manner. As shown, an engine controlling element O which may be of a well known type has its operating end supported by the handle N in position for ready manipulation by the operator to thereby start and stop the engine G, and also to vary the speed of the engine G, if the latter is not provided with an automatic speed governor as is usual. A cutter guard Q in the form of a rod or pipe extends circularly about the axis of cutter rotation alongside and in close proximity to, but slightly above, the path of movement of the outer ends of the cutter blades H. As shown, the guard member Q is in the form of a circular arc of a little less than 360°, and has its ends connected to a portion of the framework D between the axle A and cutter support C. At points distributed along its length, the guard Q is connected to the upper end of the tubular part C by spoke like members P.

Except in respect to the means operatively connecting the belt L to the engine shaft G' shown, the features of the lawn mower construction hereinbefore described may be identical with those described in my prior patent which discloses one desirable form of lawn mower of the kind in which use may be advantageously made of the improvements disclosed and claimed herein.

My improved grass catcher comprises a generally horizontal platform S laterally displaced from the longitudinal central plane of the lawn mower, i. e., the vertical plane including the cutter axis and transverse to the axle A. The receiving edge S' of the platform S is located at or about the level of the path of movement of the tips of the cutter blades H and extends along the portion of that path from which grass tips severed by the blades are impelled by the cutting blades. In the arrangement shown, the blades are assumed to rotate in the clockwise direction and the severed grass tips are thrown to the right side of the lawn mower.

In the desirable construction illustrated, the edge S' extends in the general direction of the above mentioned central plane between two planes transverse to the central plane and intersecting the latter, one adjacent the point of said path most remote from the axle A and the other adjacent the point in said path nearest the axle A. The edge S' may well be curved, at least for a portion of its length, into the general form of an arc of a circle coaxial with the cutter axis and having a radius sufficiently greater than the cutter radius to provide adequate mechanical clearance. The exact form and extent of the edge S' is not critical. Almost all of the grass cut and deposited in the grass catcher ordinarily passes over the portion of the edge S' alongside the portion of the peripheral edge of the cutter blade path, which extends rearwardly about 35° and forwardly about 60° from the vertical plane parallel to the axle A and including the axis of the tubular shaft C. With the edge S' extending along the cutter path as just described, substantially all of the grass tips cut by the blade H are thrown onto the platform S in normal operation, as a result of the fan and centrifugal force actions of the blades. The grass catcher S is provided with an uprising rim or wall portion T which extends along the entire margin of the platform except for the receiving edge S' portion thereof. The wall portion T may be six inches or a foot high. Advantageously, and as shown, the device S is provided at its side remote from the longitudinal central plane of the lawn mower with a bearing for a ground engaging wheel element U mounted to turn about an axis generally parallel to the axle A. The platform S and wall T may be made of any suitable material or materials. In particular, the said platform and wall may be formed of metal or plywood, or of canvas and a suitable rigid framework.

Advantageously, means are provided for connecting the grass catcher to the lawn mower in such manner as to permit the easy detachment and re-attachment of the grass catcher, so that the grass catcher may be detached when its use is unnecessary and to permit its use as a grass transporting device in disposing of grass collected in it. In the simple form shown, the attaching means comprises a hook W and a pair of spring fingers Y. The hook W is carried at the free end of an arm W' rigidly secured to the front end of the grass catcher structure. When the grass catcher is in use, the hook W extends through an opening formed in a bracket X clamped to the central forwardly extending guards spoke P. The spring fingers Y are attached to the grass catcher structure adjacent its rear end. The spring fingers Y are shaped to provide curved seats Y' adapted to engage and fit snugly against the opposite sides of a reduced pin-like portion Z' of the axle nut Z on the adjacent end of the axle A.

In its normal use, my improved lawn mower is pushed over the ground by a user grasping the handle member N, and the cutting portion of each cutter blade revolution comprises an arc of not more than and usually somewhat less than 180° extending clockwise about the cutter axis from a point on a line extending away from the cutter axis in a direction perpendicular to, and at the left side of the longitudinal central plane of the lawn mower. The bulk of the cutting action of each blade during each of its revolutions will thus be effected during the portion of the revolution in which the major component of the blade movement is transverse to, and from the left to the right of, the longitudinal central plane of the mower.

The engagement of a cutting blade with the severed grass blade tips at and immediately following the instant of their severance, tends to give the severed tips movements tangential to the movement of the cutter blade, as the grass blade tips move out of contact with the cutter blades. The rotating cutter structure also subjects the severed grass blade tips to a fan action which tends to move the severed tips out of and away from the orbit of the cutter blade movement. In practice, I find that almost all of the severed grass blades are deposited on a grass catcher located at the side of the rotating cutter structure, as illustrated and described herein. I believe that the deposit of practically all of the grass cut in the grass catcher arranged as shown, is due to the fact that the uncut grass in front of the lawn mower opposes the tendency of some of the grass cut to be thrown to the front of the lawn mower.

In any event, the use of my novel grass catcher has been found highly effective in practice. The grass catcher shown is simple in construction, light in weight, relatively inexpensive and includes no parts except its supporting wheel U, which are movable except as the catcher is moved bodily with the lawn mower. Relatively heavy objects struck by the cutter blades will be thrown into or ahead of the grass catcher, depending on the portion of its path of movement in which the cutter blade engages the heavy object, while all light weight objects will be thrown into the grass catcher along with the grass.

The gear and belt drive connection between the pulley I and the engine shaft G' permits that shaft to be horizontally disposed beneath the engine cylinders, which is the best possible arrangement from the engine standpoint, and permits the entire belt to be located in the same plane which contributes to belt efficiency and length of life.

While in accordance with the provisions of the statutes, I have illustrated and described the best form of my invention now known to me, it will be apparent to those skilled in the art that changes may be made in the form of the apparatus disclosed without departing from the spirit of the invention as set forth in the appended claims, and that in some cases certain features of my invention may be used to advantage without a corresponding use of other features.

Having now described my invention, what I claim as new and desire to secure by Letters Patent is:

1. Apparatus for use in catching grass cut by a lawn mower of the type comprising a framework movable over the ground and a cutter mounted in said framework to revolve about a vertically disposed axis and including one or more cutting blades horizontally extended to sweep through an annular zone surrounding said axis, said apparatus comprising a receptacle having a grass receiving platform with an elongated receiving edge portion and an uprising rim portion having end portions extending into proximity with the ends of said receiving edge portion and having a body portion laterally disposed from said edge portion, and means for attaching said receptacle to the framework of a lawn mower of the above mentioned type at the side of the cutter blade zone of movement toward which each cutter blade moves during the portion of each revolution in which the cutter action of the blade is mainly effected, and with said receiving edge alongside a portion of the peripheral edge of said zone extending between points respectively in front of and at the rear of a plane including the cutter axis of the lawn mower and extending transversely to the direction of movement of the lawn mower over the ground.

2. Grass catching apparatus as specified in claim 1, in which the receiving edge of said receptacle when attached to the lawn mower framework extends alongside of the peripheral edge of said zone rearwardly for not less than 35° and forwardly for not less than 60° from the said vertical plane including the cutter axis and transverse to the direction of lawn mower movement over the ground.

3. Grass catching apparatus as specified in claim 1, in which a receptacle supporting, ground engaging wheel is pivotally connected to said receptacle at the side of the latter remote from its receiving edge.

HEZA H. PACKWOOD.